United States Patent [19]

Sutrina

[11] Patent Number: 4,611,137

[45] Date of Patent: Sep. 9, 1986

[54] COOLING OF DYNAMOELECTRIC MACHINES

[75] Inventor: Thomas Sutrina, Rockford, Ill.

[73] Assignee: Sundstrand Corporation, Rockford, Ill.

[21] Appl. No.: 791,416

[22] Filed: Oct. 25, 1985

[51] Int. Cl.[4] ............................................. H02K 9/00
[52] U.S. Cl. ....................................... 310/54; 310/61; 310/63; 310/64; 310/261; 165/89
[58] Field of Search ....................... 310/52, 53, 54, 58, 310/57, 59, 60 R, 60 A, 62, 63, 64, 65, 211, 261; 165/89; 415/89; 417/368, 369

[56] References Cited

U.S. PATENT DOCUMENTS

| 2,643,099 | 6/1953 | Kinride et al. | 165/89 |
| 3,093,080 | 6/1963 | Tarifa et al. | 415/89 |
| 4,267,964 | 5/1981 | Williams | 415/89 |
| 4,284,913 | 8/1981 | Barnhardt | 310/54 |
| 4,394,593 | 7/1983 | Gocho | 310/54 |
| 4,448,042 | 5/1984 | Yamaguchi et al. | 310/54 |
| 4,471,249 | 9/1984 | Okamoto et al. | 310/61 |

FOREIGN PATENT DOCUMENTS

| 2659482 | 7/1978 | Fed. Rep. of Germany. |
| 1482411 | 8/1977 | United Kingdom. |
| 744854 | 6/1980 | U.S.S.R. . |

Primary Examiner—R. Skudy
Attorney, Agent, or Firm—Wood, Dalton, Phillips Mason & Rowe

[57] ABSTRACT

Windage losses due to coolant flowing to the air gap 24 of a dynamoelectric machine having a stator 10 and a rotor 18 are avoided by providing the end faces 28, 30 of the rotor 18 with radially inwardly opening grooves 38 which receive pitot pumps 40. The grooves 38 collect coolant under the influence of centrifugal force and the pitot pumps 40 collect coolant from the associated groove 38 to convey the same to a pressure pump 31.

8 Claims, 2 Drawing Figures

COOLING OF DYNAMOELECTRIC MACHINES

FIELD OF THE INVENTION

This invention relates to dynamoelectric machines, and more specifically, to a simplified means of cooling the rotors of such machines.

BACKGROUND OF THE INVENTION

Whether employed as a motor or as a generator, the capacity of a dynamoelectric machine can be greatly increased by liquid cooling its various components. Where the application to which the dynamoelectric machine is to be put warrants the expense of liquid cooling, little difficulty has been experienced in cooling stator components since, if for no other reason, the same are stationary. At the same time, the cooling of rotor components not only may require relatively sophisticated couplings such as transfer tubes or the like, but proper overall design as well or else operational inefficiency may come into the system.

More specifically, if proper care is not taken in designing the coolant flowpath for a rotor, the coolant may enter the air gap between the rotor and the stator and generate so-called "windage losses" which decrease the efficiency of operation of the machine. In order to avoid such windage losses, it has heretofore been necessary to expend considerable effort to provide a flowpath design that will not allow coolant to enter the air gap; and this in turn has increased the cost of rotor cooling systems.

Thus, there is a real need for an inexpensive but reliable system for achieving rotor cooling in a dynamoelectric machine without impairing operational efficiency of that machine. The present invention is directed to fulfilling that need.

SUMMARY OF THE INVENTION

It is the principal object of the invention to provide a new and improved cooling system for a dynamoelectric machine. More specifically, it is an object of the invention to provide such a cooling system that is simple and economical from the construction standpoint and which is reliable in terms of preventing coolant from entering the air gap between the rotor and the stator which could contribute to operational inefficiency.

An exemplary embodiment of the invention achieves the foregoing objects in a dynamoelectric machine construction including a stator and a rotor journalled for rotation within the stator and separated therefrom by an air gap. Means are provided for supplying a liquid coolant to the rotor and means are provided for removing coolant from the rotor including means on the rotor which define an annular, generally radially inwardly opening groove for receiving, under centrifugal force, coolant on the rotor. A fixed conduit has an end within the groove. The end opens within the groove toward the intended direction of rotation of the rotor. Thus, coolant from the rotor moves under the influence of centrifugal force into the groove and is directed by impact into the open end of the tube from which it may be removed from the rotor.

In a preferred embodiment of the invention, a supply pump is utilized for supplying a liquid coolant to the rotor and the conduit acts as pitot pump to provide coolant from the rotor to the inlet of the supply pump.

In a preferred embodiment, the groove is located on an end face of the rotor and in a highly preferred embodiment, there are two of such coolant removing means, one on each end face of the rotor. The means for supplying coolant to the rotor may include coolant sprays directed at both the end faces radially inwardly of the associated groove.

The invention contemplates that the groove be defined by an annular barrier radially outwardly of the rotational axis of the rotor and a peripheral, radially inwardly directed lip joined to the barrier and axially spaced from an end face of the rotor. The barrier prevents radial migration of coolant while the lip prevents axial migration of the coolant to thereby comfine the same in an annular pool for pick-up by the pitot pump.

In addition to allowing rotor cooling while preventing the flow of coolant to the air gap, on those applications where the coolant is apt to entrain air during the cooling process, the invention additionally serves to deaerate the coolant when received in the radially inwardly opening groove.

Other objects and advantages will become apparent from the following specification taken in connection with the accompanying drawings.

DESCRIPTION OF THE PREFERRED EMBODIMENT

Figure 1:
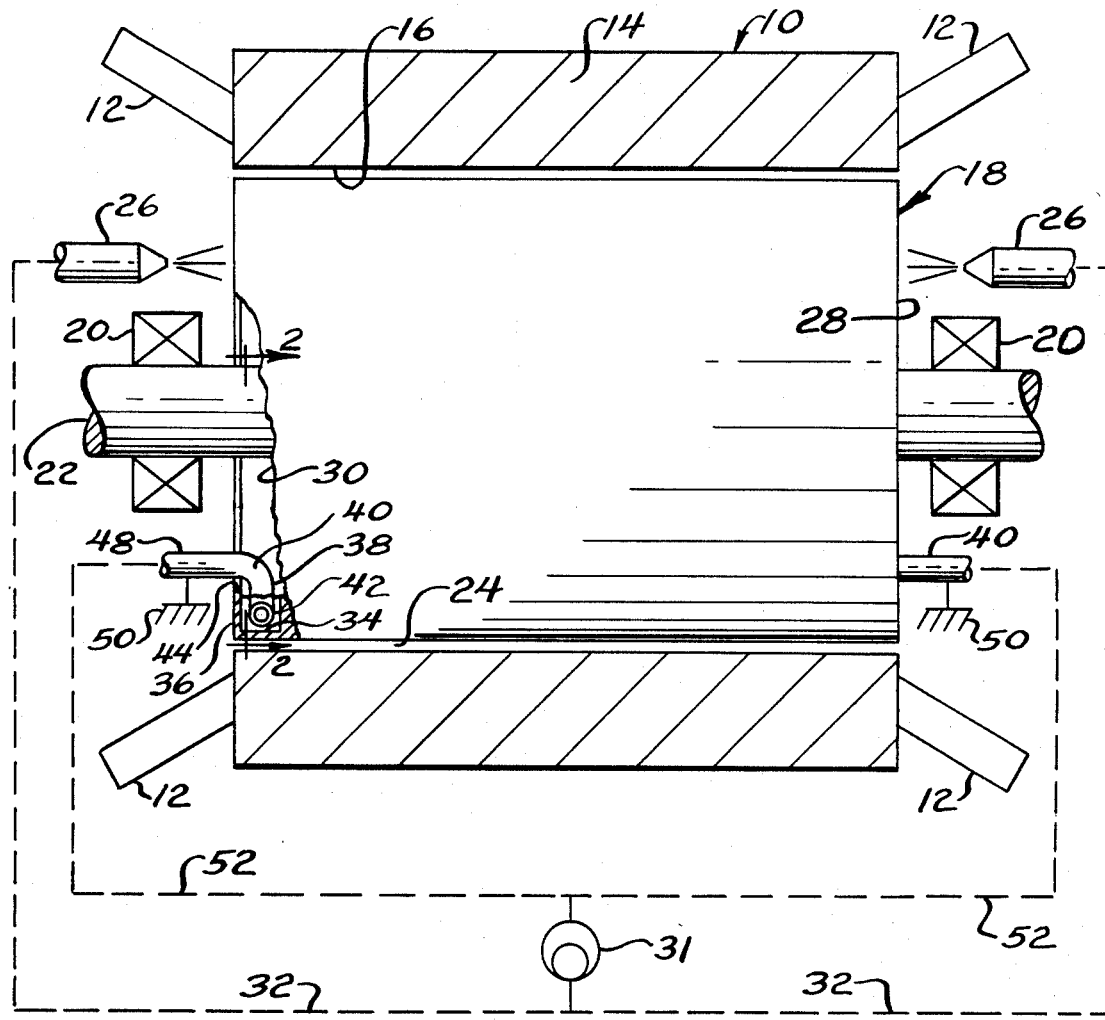
FIG. 1 is a partial sectional, partial elevational view of a dynamoelectric machine made according to the invention with parts broken away for clarity.

An exemplary embodiment of a dynamoelectric machine made according to the invention is illustrated in the drawings and may be in the form of either a motor or a generator as desired. In either event, the same includes a stator 10 provided with windings, the end turns 12 of which are seen in FIG. 1.

The stator 10 includes an armature 14 of conventional construction and which is provided with a central cylindrical bore 16 in which a rotor, generally designated 18, is journalled for rotation by bearings 20 engaging a rotor shaft 22 defining the axis of rotation of the rotor 18. As can be seen, the cylindrical periphery of the rotor 18 is separated from the armature 14 by peripheral air gap 24 and as is well known, in order to maximize the efficiency of operation of the machine, it is highly desirable that windage losses in the gap 24 be minimized. Where the dynamoelectric machine is liquid cooled, as is the present machine, this requires that coolant be prevented from entering the air gap 24.

In the form of the invention illustrated in FIG. 1, the machine may be a squirrel cage motor and cooled by coolant sprayed from nozzles 26 directed at opposite end faces 28 and 30 of the rotor 18. In the case of a squirrel cage motor, rotor constituants will generally have a high thermal conductivity so that the same may be adequately cooled in this fashion.

Coolant is supplied to the nozzles 26 from a main pressure or supply pump 31 via the conduits 32 illustrated in dotted lrnes.

Although spray cooling of the rotor is illustrated, it is to be expressly understood that the invention contemplates that coolant could be applied to the rotor 18 by other means as, for example, a transfer tube including a conduit to the shaft 22 extending to the innards of the rotor 18.

In either event, the coolant ultimately will find its way to the end faces 28 and 30 of the rotor and during operation of the machine, will tend to migrate radially outwardly under the influence of centrifugal force. That is, the coolant, regardless of how delivered to the rotor 18, will tend to move along the end faces 28 and 30 toward the air gap 24.

To prevent the coolant from entering the air gap, both end faces 28 and 30 of the rotor 18 are provided with an annular, generally cylindrical barrier 34 which may be in the form of an axial continuation of the exterior surface of the rotor 18 itself. The barrier 34 serves to prevent radial migration of the coolant toward the air gap 24.

Spaced from the end face 28 or 30, as the case may be and joined to the barrier 34, is a radially inwardly directed lip 36 which extends peripherally about the respective end of the rotor 18 and which serves to prevent axial migration of coolant away from the associated end face 28 or 30. In addition, it will be appreciated that the lip 36 and the barrier 34 together with the associated end face define a radially inwardly opening peripheral groove 38.

Figure 2:
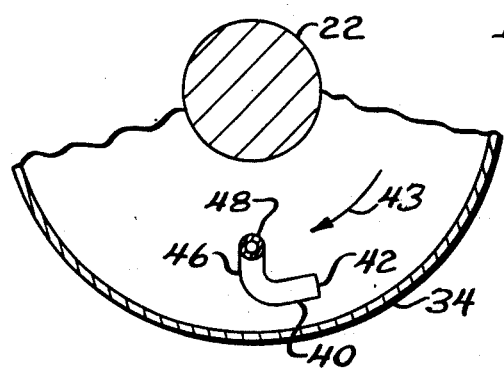
FIG. 2 is a sectional view taken approximately along the line 2—2 in FIG. 1.

Located within the groove 38 on each of the end faces 28 and 30 of the rotor 18 is a pitot tube 40 having an open end 42 (FIG. 2) opening toward the direction of rotation of the rotor as indicated by an arrow 43.

As can be seen in FIG. 1, the end 42 of the pitot tube is located radially outwardly of the radially inner edge 44 of the lip 36 and adjacent to the barrier 34.

The pitot tube 40 includes a radially inwardly directed segment 46 terminating in an axial segment 48 which is fixed to the frame as schematically indicated at 50 in FIG. 1. A conduit 52 extends from each pitot tube 40 to the inlet of the pressure pump 31.

Upon operation of the machine, the coolant will migrate radially outwardly along the end faces 28 and 30 of the rotor 18 under the influence of centrifugal force until encountering the barrier 34. A ring like pool of coolant will then build up within the groove 38 on each end face of the rotor 18 and the ring of coolant will, of course, rotate with the rotor 18. As a consequence of the emersion of the open end 42 of the pitot tube 40 in the pool of coolant accumulating in each groove 38, the rotation of the rotor 18 will drive the coolant into the pitot tube which acts as a pitot pump and delivers the coolant under a velocity head to the pressure pump 31. The pressure pump 31 then provides coolant to the spray nozzles 26 under a pressure head as is well known.

As a consequence of this construction, it will be appreciated that the invention eliminates the need for a transfer tube exiting the rotor 18 to convey coolant away from the rotor and, when constructed in the form illustrated in FIG. 1, eliminates the transfer tube for incoming coolant as well. In addition, the invention provides for removal of coolant from the rotor in a simple fashion utilizing pitot pumps which, in connection with the barrier 34 and the lips 36 prevents the flow of coolant to the air gap 24 to thereby maximize efficiency of operation of the machine.

Moreover, where the nature of the application of the coolant to the rotor 18 may involve the entrainment of air in the coolant, as, for example, in the spray scheme illustrated in FIG. 1, it will be appreciated that the invention deaerates the coolant before the same is provided to the pump 31. In particular, the coolant typically being more dense than air, will move radially outwardly within the groove 38 to displace any air contained within the coolant, which air will move radially inwardly thereby deaerating the coolant. Consequently, the need for a deaerator upstream of the inlet to the pump 31 is avoided.

I claim:
1. A dynamoelectric machine comprising;
   a stator;
   a rotor journalled for rotation within said stator and separated therefrom by an air gap;
   means for supplying a liquid coolant to said rotor and including a pressure pump; and
   means for removing coolant from said rotor including means on said rotor defining an annular, generally radially inwardly opening groove for receiving, under centrifugal force, coolant on said rotor, and a fixed conduit having an end within said groove, said end opening within said groove toward the intended direction of rotation of said rotor, said conduit being in fluid communication with said supplying means.

2. The dynamoelectric machine of claim 1 wherein said end is a pitot tube.

3. The dynamoelectric machine of claim 1 wherein said groove is located on an end face of said rotor.

4. The dynamoelectric machine of claim 1 wherein there are two said removing means, one on each end face of said rotor.

5. The dynamoelectric machine of claim 4 wherein said supplying means include coolant sprays directed at both said end faces radially inwardly of the associated groove.

6. A dynamoelectric machine comprising:
   a stator;
   a rotor journalled for rotation about an axis within said stator and separated therefrom by an air gap, said rotor having an end face exposed to liquid coolant during operation of said machine;
   means at said end face for collecting said coolant including an annular barrier radially outwardly of said axis for preventing radially outward migration of coolant on said end face and joined to a radially inwardly directed lip axially spaced from said end face for preventing axial migration of coolant away from said rotor; and
   a stationary pitot tube disposed just radially inwardly of said barrier and between said end face and said lip and opening toward the direction of intended rotation of said rotor for receiving coolant by impact and conveying the same away from said air gap.

7. A dynamoelectric machine comprising:
   a stator;
   a rotor journalled for rotation about an axis within said stator and separated therefrom by an air gap, said rotor having an end face exposed to liquid coolant during operation of said machine;
   means at said end face for collecting said coolant including an annular barrier radially outwardly of said axis for preventing radially outward migration of coolant on said end face and joined to a radially inwardly directed lip axially spaced from said end face for preventing axial migration of coolant away from said rotor; and
   a pitot pump adjacent said barrier.

8. The dynamoelectric machine of claim 7 including a supply pump having an inlet connected to said pitot pump and an outlet for supplying coolant to said machine.

* * * * *